July 8, 1952     W. P. FREAS     2,602,523
AIR LINE OILER
Filed Sept. 2, 1949
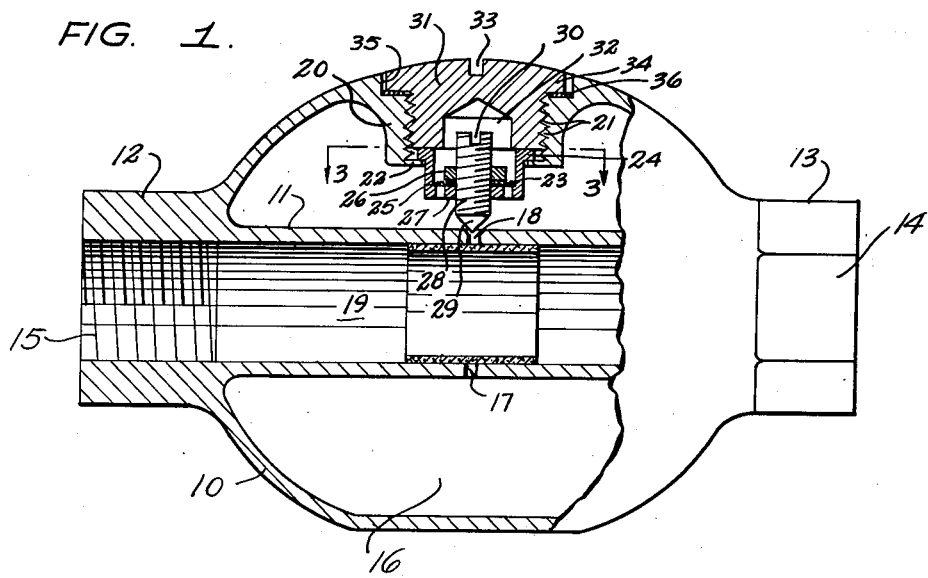
FIG. 1.
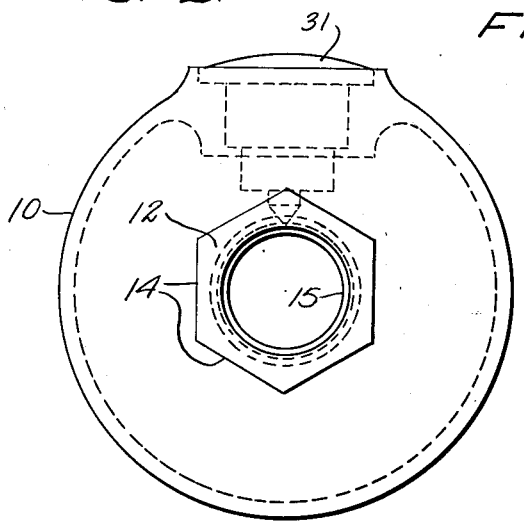
FIG. 2.
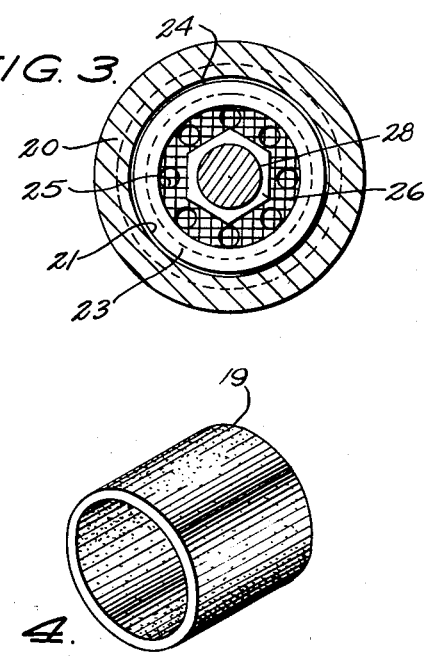
FIG. 3.
FIG. 4.
INVENTOR.
WILBUR P. FREAS,
BY
McMorrow, Berman & Davidson
ATTORNEYS.

Patented July 8, 1952

2,602,523

UNITED STATES PATENT OFFICE 2,602,523

AIR LINE OILER

Wilbur P. Freas, Philadelphia, Pa.

Application September 2, 1949, Serial No. 113,706

1 Claim. (Cl. 184—55)

This invention relates to air line oilers, and more particularly to a device which may be connected into an air line to supply oil to compressed air operated tools, such as rock drills, riveting hammers, et cetera. It is among the objects of the invention to provide an improved air line oiler of simplified construction which can be connected directly into an air line, and is effective to meter oil into the air passing through such oil line and can be adjusted to vary the amount of oil so metered to accommodate the oil supply to variations in the number of tools connected to the air line, which provides means for filtering the oil supplied to the oiler and refiltering the oil supplied by the oiler to the air in the air line, which provides no obstruction to compressed air passing therethrough, and which is strong and durable in construction, simple and economical to manufacture, and easy to install and adjust.

Other objects and advantages will become apparent from a consideration of the following description and the appended claims in conjunction with the accompanying drawing, wherein:

Figure 1 is a side elevation of an air line oiler illustrative of the invention, the major portion of the oiler being broken away and shown in cross-section to better illustrate the construction thereof;

Figure 2 is an end elevation of the air line oiler illustrated in Figure 1;

Figure 3 is a cross-section on the line 3—3 of Figure 1; and

Figure 4 is a perspective view of a filter bushing constituting an operative component of the oiler.

With continued reference to the drawing, the oiler comprises a hollow, substantially globular body 10 having a tubular conduit 11 extending substantially diametrically therethrough and having outwardly-extending tubular bosses 12 and 13 at the respectively-opposite ends of the conduit 11.

The body 10, conduit 11, and bosses 12 and 13 are preferably integrally formed by a suitable method, such as casting, from a strong and corrosion-resisting metal, such as brass.

The bosses 12 and 13 are provided with polygonal, external surfaces providing contiguous flat faces 14 for receiving a wrench or an equivalent tool to facilitate connecting the oiler into an air line, and are provided internally with screw threads 15 to receive terminal fittings on the two parts of the air line connected to the oiler.

The body 10 has a diameter materially greater than the diameter of the tubular conduit 11 and provides an annular oil reservoir 16 surrounding the tubular conduit.

Intermediate its length, the tubular conduit is provided with at least two orifices, as indicated at 17 and 18, through which oil may pass from the reservoir 16 into the conduit and thus, into compressed air passing through the interior of the conduit 11.

A tubular, cylindrical bushing 19 of porous material, such as porous bronze, is seated in the conduit 11 in position to cover the orifices 17 and 18, so that oil flowing through the orifices will have to flow through the porous filter 19 before reaching the air passing through the conduit 11. This filter prevents any foreign material, such as grit or scale, from passing into the air, or from passing from the air into the oil in the oiler and also has a wick effect in facilitating the passage of the oil into the air flowing through the conduit, as the filter will absorb oil and distribute it to the air over substantially the entire area of the filter.

A hollow boss 20 of circular, cross-sectional shape is formed interiorly of the body 10 in a position such that its center line, when extended, will pass substantially centrally through the orifice 18. This boss is provided with internal screw threads 21, and at its inner end with an inwardly-directed, annular flange or shoulder 22. A cylindrical sleeve 23 is disposed in the boss 20 and has at one end an outwardly-extending annular flange 24 which rests on the internal flange 22 of the boss, and this sleeve extends inwardly of the body from the inner end of the boss 20, as is clearly illustrated in Figure 1.

A circular filter screen 25 is marginally secured in the sleeve 23 near the inner end of the latter, and two nuts 26 and 27 are secured to this screen at respectively-opposite sides thereof and are uniformly spaced annularly from the internal surface of the sleeve 23. A valve screw 28 is threaded through the nuts 26 and 27 and extends through the filter screen toward the orifice 18. At its end adjacent the orifice the valve screw 28 has a conical or pointed end 29, which cooperates with the orifice 18 to regulate the amount of oil flowing through this orifice, and at its outer end the valve screw 28 is provided with a tool slot 30 by means of which the valve screw can be adjusted relative to the orifice.

The orifice 17 has a capacity sufficient to supply the oil required for one or two tools connected to the air line. Under these conditions the valve screw 28 will be adjusted to close off the orifice 18. If more tools are added to the line, the valve screw 28 will be adjusted to open the orifice 18 sufficiently to supply the required oil for the additional tools.

The filter screen 25 filters oil poured into the body 10 through the filling opening provided by the boss 20, so that the oil is filtered as it is supplied to the oil reservoir 16. This oil is re-filtered by the filter bushing 19 as it is supplied from the reservoir 16 to the air passing through the conduit 11.

An externally screw-threaded plug 31 is threaded into the boss 20 to provide a closure for the filler opening provided by the boss, and this plug is provided, in its inner end, with a well or recess 32 providing a space for the outer end of the valve screw 28 and in its outer end with a tool slot 33 for tightening the closure plug in the boss. At its outer end the plug 31 is provided with an annular flange 34, and the boss 20 is provided with a counterbore 35 receiving this flange. The bottom surface of the flange and the bottom surface of the counterbore 35 provide opposed annular shoulders, and a sealing gasket 36 is disposed between the shoulders to provide an airtight seal between the closure plug 31 of the body 10.

When compressed air passes through a compressed air line to a tool which is in operation, the operation of the tool causes pulsations in the pressure of the air in the line. These pulsations in the air pressure are effective to feed the oil from the reservoir 16 into the conduit 11, since, when the air pressure is high, air will flow through the porous filter 19 and the orifices 17 and 18 into the body 10 to build up a pressure in the body substantially equal to the pressure of the air in the air line, and when the pressure in the air line is reduced, the higher pressure in the body 10 will force some of the oil through the orifices and the filter bushing 19 into the interior of the conduit 11 where it is picked up by the air flowing through this conduit.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

An air line oiler comprising a hollow body having a tubular air conduit extending therethrough and providing interiorly thereof an annular oil reservoir surrounding said conduit, said conduit having intermediate its length at least two orifices, a tubular, porous filter in said conduit covering said orifices, means at each end of said conduit for connecting said oiler into an air line, an internal apertured boss in said body having screw threads therein, a filter screen seated in said boss, a screw valve carried by said screen and cooperating with one of said orifices to regulate the flow of oil from said reservoir into said conduit, and a screw-threaded closure plug for said boss.

WILBUR P. FREAS.

REFERENCES CITED

The following references are of record in the file of this patent:

UNITED STATES PATENTS

| Number | Name | Date |
|---|---|---|
| 1,177,713 | Leonard | Apr. 4, 1916 |
| 1,669,375 | Ihrmark | May 8, 1928 |
| 2,073,009 | Hersey | Mar. 9, 1937 |
| 2,111,583 | De Mooy | Mar. 22, 1938 |